(12) United States Patent
Shan et al.

(10) Patent No.: US 11,881,589 B2
(45) Date of Patent: Jan. 23, 2024

(54) BATTERY MODULE AND BATTERY PACK HAVING SAME FOR VEHICLE

(71) Applicant: SVOLT ENERGY TECHNOLOGY COMPANY LIMITED, Changzhou (CN)

(72) Inventors: Xiaolin Shan, Changzhou (CN); Youngbin Lim, Changzhou (CN); Lijuan Tang, Changzhou (CN); Weihua Li, Changzhou (CN); Kun Ma, Changzhou (CN)

(73) Assignee: SVOLT ENERGY TECHNOLOGY COMPANY LIMITED, Changzhou (CN)

( * ) Notice: Subject to any disclaimer, the term of this patent is extended or adjusted under 35 U.S.C. 154(b) by 574 days.

(21) Appl. No.: 16/950,229

(22) Filed: Nov. 17, 2020

(65) Prior Publication Data
US 2021/0074966 A1  Mar. 11, 2021

Related U.S. Application Data

(63) Continuation of application No. PCT/CN2019/087468, filed on May 17, 2019.

(51) Int. Cl.
*H01M 50/20* (2021.01)
*H01M 50/54* (2021.01)

(52) U.S. Cl.
CPC ........... *H01M 50/20* (2021.01); *H01M 50/54* (2021.01); *H01M 2220/20* (2013.01)

(58) Field of Classification Search
None
See application file for complete search history.

(56) References Cited

U.S. PATENT DOCUMENTS

2010/0266887 A1* 10/2010 Sekino ............... H01M 50/507
429/123
2013/0273404 A1* 10/2013 Ochi .................. H01M 50/291
429/99

FOREIGN PATENT DOCUMENTS

| CN | 102024976 A | 4/2011 |
|---|---|---|
| CN | 203192869 U | 9/2013 |
| CN | 103560223 A | 2/2014 |
| CN | 104064716 A | 9/2014 |
| CN | 107845752 A | 3/2018 |

(Continued)

OTHER PUBLICATIONS

International Search Report and Written Opinion dated Aug. 15, 2019 in International Application No. PCTCN2019/087468, 12 pages.

(Continued)

*Primary Examiner* — Wyatt P McConnell
(74) *Attorney, Agent, or Firm* — Lee & Hayes, P.C.

(57) ABSTRACT

Disclosed are a battery module and a battery pack having the same for a vehicle. The battery module includes a cell row and output electrode connecting plates. The cell row has a first end and a second end in an arrangement direction of a plurality of cells. Each cell includes a first end cell located at the first end and a second end cell located at the second end. The output electrode connecting plates include a positive electrode connecting plate and a negative electrode connecting plate, one of which is connected to the first end cell, and the other is connected to a cell adjacent to the first end cell.

19 Claims, 4 Drawing Sheets

(56) References Cited

FOREIGN PATENT DOCUMENTS

| | | |
|---|---|---|
| CN | 208444901 U | 1/2019 |
| EP | 2202825 A1 | 6/2010 |

OTHER PUBLICATIONS

European Search Report dated Jan. 28, 2022 in European Application No. 19802781.5, a foreign corresponding application of U.S. Appl. No. 16/950,229, 6 pages.

* cited by examiner

BATTERY MODULE AND BATTERY PACK HAVING SAME FOR VEHICLE

CROSS-REFERENCE TO RELATED APPLICATION

The present application is a continuation of International Application No. PCT/CN2019/087468, filed on May 17, 2019, which claims priority to Chinese Patent Application No. 201820750338.2, filed on May 18, 2018, the entire contents of which are incorporated herein by reference.

TECHNICAL FIELD

The present disclosure relates to the field of vehicle manufacturing, and more particularly, to a battery module and a battery pack having the same for a vehicle.

BACKGROUND

In the related art, a battery module of a battery pack for a vehicle includes positive and negative output ends respectively located at two ends of the battery module in a length direction, in such a manner that two high-voltage wire harnesses respectively connected to the positive and negative output ends are respectively connected to two ends of the battery pack in the length direction. Since the two high-voltage wire harnesses need to be brought together before transmitting power, and positions where the two high-voltage wire harnesses are connected to the battery module are far away from each other, the high-voltage wire harnesses in this solution have great wiring lengths in the battery pack.

Therefore, when a collision or a squeeze happens to the vehicle, the high-voltage wire harnesses are susceptible to a risk of short circuit and catching fire under squeezing. In addition, low-voltage wire harnesses and high-voltage wire harnesses are prone to be parallel to each other during the wiring in the battery pack. In this manner, the high-voltage wire harnesses are likely to exert electromagnetic interference on the low-voltage wire harnesses, which might affect the accuracy of signal acquisition and transmission in the low-voltage wire harnesses.

SUMMARY

In view of the above problems, the present disclosure aims to provide a battery module, which can at least reduce the wiring length of the high-voltage wire harnesses to some extent.

To achieve the above objective, the technical solution of the present disclosure is implemented as follows.

A battery module is provided. The battery module includes a cell row and output electrode connecting plates. The cell row includes multiple cells arranged in series with each other in a row. The cell row has a first end and a second end in an arrangement direction of the multiple cells. The plurality of cell includes a first end cell at the first end and a second end cell at the second end. The output electrode connecting plates include a positive electrode connecting plate and a negative electrode connecting plate. One of the positive electrode connecting plate and the negative electrode connecting plate is connected to the first end cell, and the other one is connected to a cell adjacent to the first end cell.

Further, the battery module further includes connecting bus-bars including middle connecting bus-bars and a tail connecting bus-bar. The tail connecting bus-bar is adapted to connect the second end cell to a cell adjacent to the second end cell, and the middle connecting bus-bars is adapted to connect remaining electrodes of the plurality of cells.

Further, an arrangement of positive and negative electrodes of the second end cell is opposite to an arrangement of positive and negative electrodes of the cell adjacent to the second end cell. A positive electrode plate and a negative electrode plate of each of the plurality of cells are respectively arranged at a first side and a second side of a top surface of the cell, a safety valve is provided between the positive electrode plate and the negative electrode plate of each of the plurality of cells, the connecting bus-bars are divided into two groups, and the two groups are respectively arranged at the first side and the second side in such a manner that the connecting bus-bars avoid the safety valve.

Further, an arrangement of positive and negative electrodes of $(4n)^{th}$ and $(4n-1)^{th}$ cells counted from the second end cell is identical to the arrangement of the positive and negative electrodes of the second end cell, and an arrangement of positive and negative electrodes of $(4n-2)^{th}$ and $(4n-3)^{th}$ cells counted from the second end cell is opposite to the arrangement of the positive and negative electrodes of the second end cell, where n is a positive integer. The middle connecting bus-bars include a first connecting bus-bar and a second connecting bus-bar, each of the first connecting bus-bar and the second connecting bus-bar being connected to two cells adjacent to one of the plurality of cells.

Further, an arrangement of the positive and negative electrodes of the second end cell is identical to an arrangement of the positive and negative electrodes of the cell adjacent to the second end cell. The positive electrode plate and the negative electrode plate of each of the plurality of cells are respectively arranged at the first side and the second side of the top surface of the cell, a safety valve is provided between the positive electrode plate and the negative electrode plate of each of the plurality of cells, the middle connecting bus-bars are divided into two groups, the two groups are respectively arranged at the first side and the second side to allow the middle connecting bus-bars to avoid the safety valve, and the tail connecting bus-bar is provided with an avoidance concave portion for avoiding the safety valve.

Further, an arrangement of positive and negative electrodes of $(4n)^{th}$ and $(4n-1)^{th}$ cells counted from the second end cell is opposite to the arrangement of the positive and negative electrodes of the second end cell, and an arrangement of positive and negative electrodes of $(4n-2)^{th}$ and $(4n-3)^{th}$ cells counted from the second end cell is identical to the arrangement of the positive and negative electrodes of the second end cell, where n is a positive integer. The middle connecting bus-bars include a first connecting bus-bar and a second connecting bus-bar, each of the first connecting bus-bar and the second connecting bus-bar being connected to two cells adjacent to of one of the plurality of cells.

Further, the first connecting bus-bar includes a first positive electrode plate, a first connecting plate, and a first negative electrode plate, the first positive electrode plate being parallel to the first negative electrode plate, the first connecting plate being vertically connected to a same side of the first positive electrode plate and the first negative electrode plate, and a height of the first connecting plate being higher than a height of the first positive electrode plate and a height of the first negative electrode plate. The second connecting bus-bar includes a second positive electrode plate, a second connecting plate, and a second negative electrode plate, the second positive electrode plate being parallel to the second negative electrode plate, the second connecting plate being vertically connected to a same side of the second positive electrode plate and the second negative electrode plate, and a height of the second connecting plate being identical to a height of the second positive electrode plate and a height of the second negative electrode plate. For the first connecting bus-bar and the second connecting bus-bar that are adjacent to each other, the first connecting plate is arranged above the second connecting plate.

Further, an insulating layer is provided between the first connecting plate and the second connecting plate.

Further, each of the first connecting plate and the second connecting plate is provided with a downwardly bent groove at a contact gap between two adjacent ones of the plurality of cells.

Further, a top corner of the first connecting plate at a side facing away from the first positive electrode plate is a rounded corner. A top corner of the second connecting plate at a side facing away from the second positive electrode plate is a rounded corner.

Further, at least one of the positive electrode connecting plate and the negative electrode connecting plate includes a bending portion, a bending corner of the bending portion being a rounded corner, and at least one of the positive electrode connecting plate and the negative electrode connecting plate has an avoidance opening for avoiding the safety valve of the cell.

Further, the battery module further includes a cube-shaped module frame. The cell row is positioned in the module frame. An upper end surface between two longer sides of the module frame is provided with a mounting plate. The mounting plate extending towards the cell row and resting against a side of the cell row facing towards the longer sides. Each of the output electrode connecting plates has a bending structure and includes: a first plate adapted to be attached to a top surface of the cell row, a second plate adapted to be attached to a side of the cell row facing towards the longer sides, and a third plate adapted to be attached and fixed to a top surface of the mounting plate.

Compared with the related art, the battery module provided by the present disclosure has the following advantage.

According to the battery module of the present disclosure, the positive electrode connecting plate and the negative electrode connecting plate are connected at the same side of the battery module, which facilitates centralized arrangement of a high-voltage wire harness of the positive electrode connecting plate and a high-voltage wire harness of the negative electrode connecting plate, thereby reducing the wiring length of the high-voltage wire harness.

Another objective of the present disclosure is to provide a battery pack for a vehicle. The battery pack includes the battery module in any aspect described above.

Compared with the related art, the battery pack for the vehicle according to the present disclosure has the following advantages.

According to the battery pack for the vehicle provided by the present disclosure, the arrangement of the battery module reduces the wiring length of the high-voltage wire harnesses in the battery pack, thereby preventing a long-distance parallel wiring between the low-voltage wire harnesses and the high-voltage wire harnesses in the battery pack while ensuring the accuracy of signal acquisition and transmission in the low-voltage wire harnesses.

BRIEF DESCRIPTION OF DRAWINGS

The accompanying drawings constituting a part of the present disclosure are used to provide a further understanding of the present disclosure. The exemplary embodiments of the present disclosure and their descriptions are used to explain the present disclosure, and do not constitute an improper limitation of the present disclosure.

REFERENCE NUMERALS OF THE ACCOMPANYING DRAWING

Figure 1:
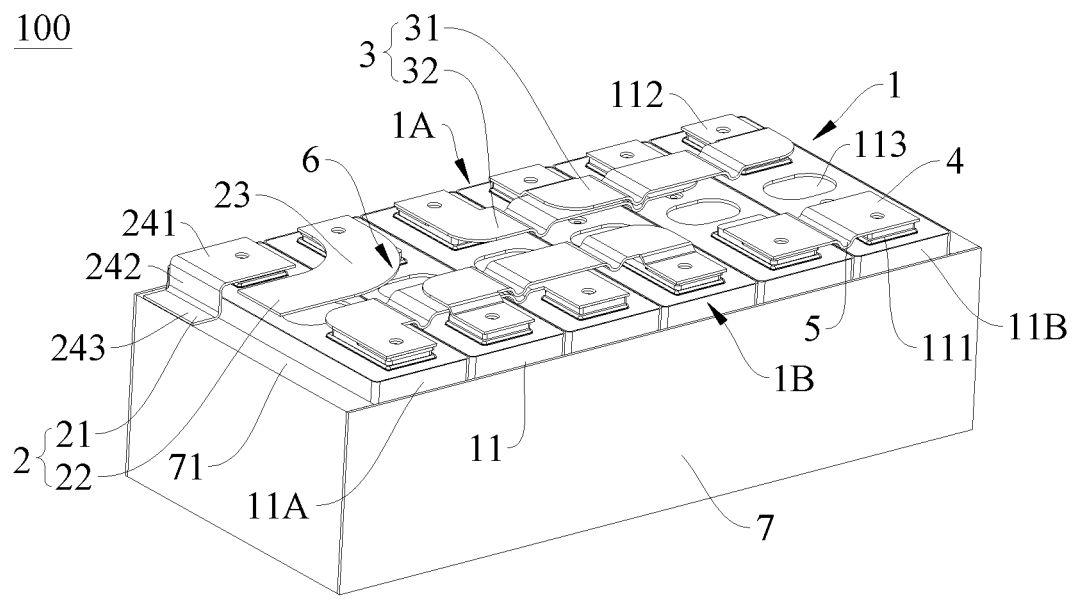
FIG. 1 is a perspective view of a battery module according to a first embodiment of the present disclosure.

100—battery module, 1—cell row, 1A—first side, 1B—second side, 11—cell, 11A—first end cell, 11B—second end cell, 111—positive electrode plate, 112—negative electrode plate, 113—safety valve, 2—output electrode connecting plate, 21—positive electrode connecting plate, 22—negative electrode connecting plate, 23—bending portion, 241—first plate, 242—second plate, 243—third plate, 3—middle connecting bus-bar, 31—first connecting bus-bar, 311—first positive electrode plate, 312—first connecting plate, 313—first negative electrode plate, 32—second connecting bus-bar, 321—second positive electrode plate, 322—second connecting plate, 323—second negative electrode plate, 4—tail connecting bus-bar, 5—groove, 6—rounded corner, 7—module frame, 71—mounting plate.

DESCRIPTION OF EMBODIMENTS

It should be noted that embodiments of the present disclosure and features in the embodiments may be combined with each other without mutual contradiction.

The present disclosure will be described in detail below with reference to the accompanying drawings and in combination with embodiments.

A battery module 100 according to embodiments of the present disclosure will be described below with reference to FIGS. 1 to 8 and in combination with the embodiments.

As illustrated in FIGS. 1 to 8, the battery module 100 according to embodiments of the present disclosure may include a cell row 1 and output electrode connecting plates 2. The cell row 1 may include a plurality of cells 11 arranged in series with each other in a row. The plurality of cells 11 may be arranged along a length direction of the cell row 1.

As illustrated in FIGS. 1 to 5, for ease of description, two ends of the cell row 1 in the length direction (that is, along a direction in which the cells 11 are arranged) are respectively set as a first end and a second end. A cell 11 located at the first end of the cell row 1 among the plurality of cells 11 (i.e., a cell 11 closest to the first end of the cell row 1 among the multiple cells 11) is set as a first end cell 11A. A cell 11 located at the second end of the cell row 1 among the multiple cells 11 (i.e., a cell 11 closest to the second end of the cell row 1 among the multiple cells 11) is set as a second end cell 11B.

As illustrated in FIGS. 1 to 5, the output electrode connecting plates 2 may include a positive electrode connecting plate 21 and a negative electrode connecting plate 22. One of the positive electrode connecting plate 21 and the negative electrode connecting plate 22 is connected to the first end cell 11A, and the other is connected to a cell 11 adjacent to the first end cell 11A.

For example, in some specific embodiments, the positive electrode connecting plate 21 may be connected to a positive electrode of the first end cell 11A, and the negative electrode connecting plate 22 may be connected to a negative electrode of a cell 11 adjacent to the first end cell 11A and located on an inward side of the first end cell 11A. In other specific embodiments, the negative electrode connecting plate 22 may be connected to a negative electrode of the first end cell 11A, and the positive electrode connecting plate 21 may be connected to a positive electrode of the cell 11 adjacent to the first end cell 11A and located at the inward side of the first end cell 11A.

Therefore, both the positive electrode connecting plate 21 and the negative electrode connecting plate 22 may be near the first end of the cell row 1. Each of the positive electrode connecting plate 21 and the negative electrode connecting plate 22 may be connected to one high-voltage wire harness, in such a manner that two high-voltage wire harnesses may be connected to the cell row 1 at the first end of the cell row 1.

With the battery module 100 according to embodiments of the present disclosure, one of the positive electrode connecting plate 21 and the negative electrode connecting plate 22 is connected to the first end cell 11A, and the other is connected to the cell 11 adjacent to the first end cell 11A. Compared with the two high-voltage wire harnesses in the related art extending from the first end and the second end of the cell row to the same place, high-voltage wire harnesses in the present disclosure may be directly brought together at the first end of the cell row 1, and may directly exit the battery pack, such that the high-voltage wire harnesses do not need to extend a long distance in the battery pack to meet each other.

Since the high-voltage wire harnesses has a small length in the battery pack, wires may be saved and wiring is facilitated. In addition, in a case where the high-voltage wire harnesses in the battery pack are squeezed due to a collision or a squeeze of the battery pack resulted from a collision happening to a vehicle, the risk of short circuit and catching fire under squeezing is reduced, and thus the battery pack is of a higher level of security. Moreover, long-distance parallel wiring of the low-voltage wire harnesses and the high-voltage wire harnesses in the battery pack may be avoided, so as to prevent the high-voltage wire harnesses from exerting electromagnetic interference on the low-voltage wire harnesses, thereby ensuring the accuracy of signal acquisition and transmission in the low-voltage wire harnesses.

In some embodiments of the present disclosure, as illustrated in FIGS. 1 to 8, the battery module 100 may further include connecting bus-bars. The connecting bus-bars may include middle connecting bus-bars 3 and a tail connecting bus-bar 4. The tail connecting bus-bar 4 is adapted to connect the second end cell 11B with a cell 11 adjacent to the second end cell 11B and located on an inward side of the second end cell 11B. The middle connecting bus-bars 3 are adapted to connect remaining electrode plates of the cell 11.

In this manner, the middle connecting bus-bars 3 and the tail connecting bus-bar 4 may achieve series connections among the cells 11, and the power of the battery row 1 may be output from the two cells 11 at the first end.

In some specific embodiments, as illustrated in FIGS. 1 to 4, a positive electrode plate 111 and a negative electrode plate 112 of each cell 11 may be respectively arranged on a first side 1A and a second side 1B of a top surface of the cell 11. The first side 1A and the second side 1B of the cell 11 may be located at two ends of the cell row 1 in a width direction, respectively. An arrangement of positive and negative electrodes of the second end cell 11B may be opposite to an arrangement of positive and negative electrodes of the cell 11 adjacent to the second end cell 11B and located at the inward side of the second end cell 11B. For example, the positive electrode plate 111 of the second end cell 11B and the negative electrode plate 112 of the cell 11 adjacent to the second end cell 11B and located at the inward side of the second end cell 11B may be located on the same side.

Figure 2:
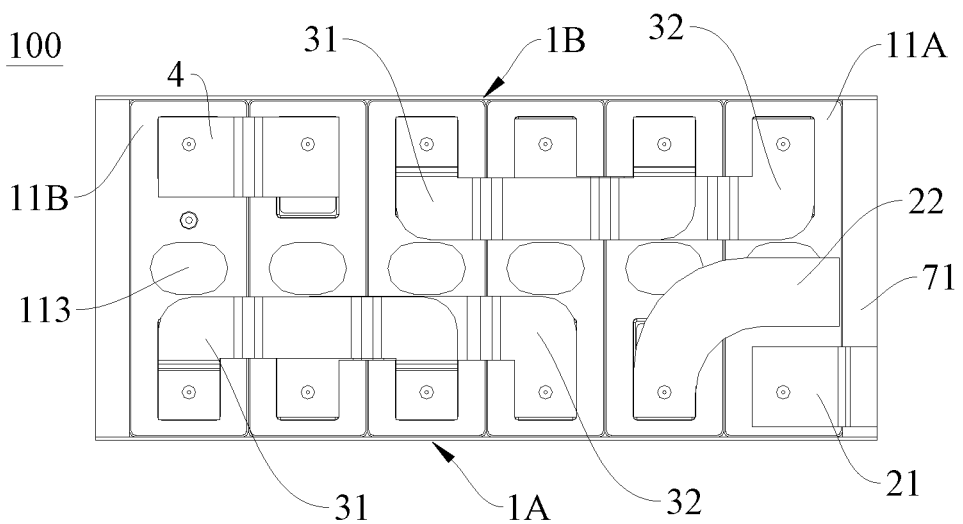
FIG. 2 is a top view of a battery module according to the first embodiment of the present disclosure.

As illustrated in FIGS. 1 and 2, a safety valve 113 may be provided between the positive electrode plate 111 and the negative electrode plate 112 of each cell 11. When the cell 11 is heated, gas in the cell 11 may be discharged from the safety valve 113 in time, to ensure that the cell 11 works normally.

Figure 3:
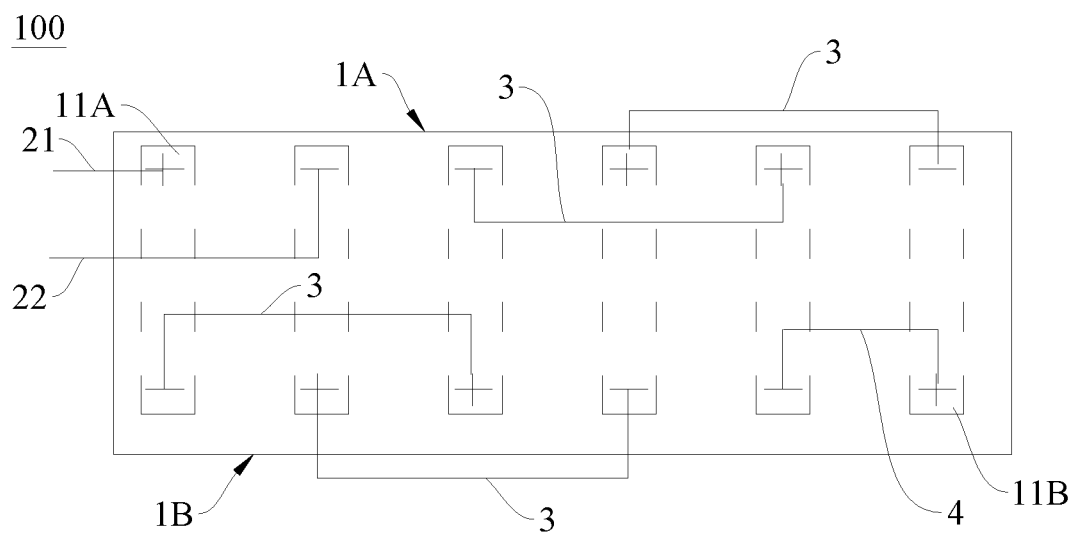
FIG. 3 is a schematic diagram illustrating connections among a plurality of cells according to the first embodiment of the present disclosure.
Figure 4:
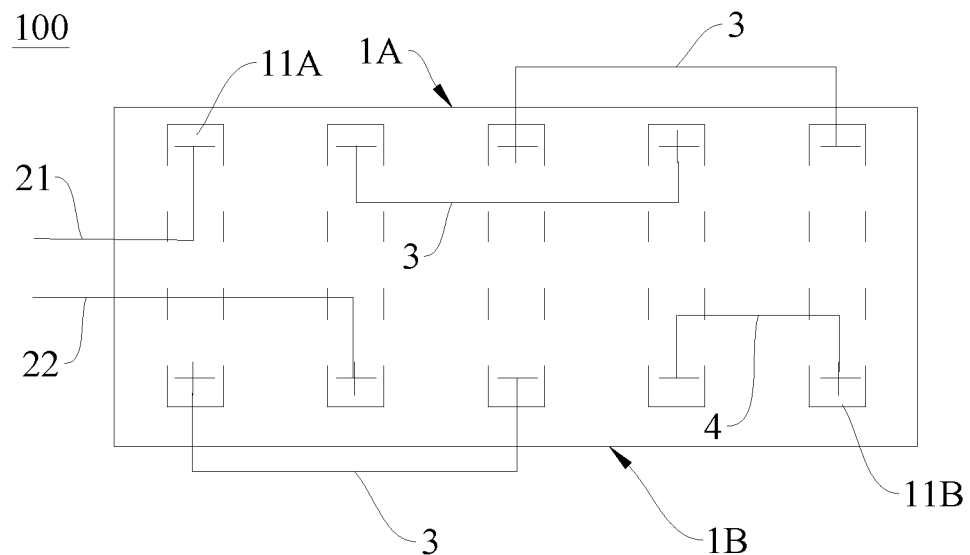
FIG. 4 is a schematic diagram illustrating connections among a plurality of cells according to a second embodiment of the present disclosure.

In some specific embodiments, as illustrated in FIGS. 3 and 4, the connecting bus-bars may be divided into two groups of connecting bus-bars. One group may be arranged on the first side 1A along an extending direction of the cell row 1, and the other group may be arranged on the second side 1B along the extending direction of the cell row 1. In this manner, the connecting bus-bars may avoid the safety valve 113 between the electrode plate on the first side 1A of the cell 11 and the electrode plate on the second side 1B of the cell 11, thereby ensuring that the safety valve 113 and thus the cell row 1 work normally.

In some specific embodiments, as illustrated in FIGS. 3 and 4, an arrangement of positive and negative electrodes of $(4n)^{th}$ and $(4n-1)^{th}$ cells 11 counted from the second end cell 11B may be identical to the arrangement of the positive and negative electrodes of the second end cell 11B, and an arrangement of positive and negative electrodes of $(4n-2)^{th}$ and $(4n-3)^{th}$ cells 11 counted from the second end cell 11B may be opposite to the arrangement of the positive and negative electrodes of the second end cell 11B, where n may be a positive integer. Consequently, it may be ensured that the arrangement of the positive and negative electrodes of the second end cell 11B is opposite to the arrangement of the positive and negative electrodes of the cell 11 adjacent to the second end cell 11B and located at the inward side of the second end cell 11B.

In addition, according to the above arrangements, as illustrated in FIGS. 3 and 4, the middle connecting bus-bars 3 may include a first connecting bus-bar 31 and a second connecting bus-bar 32. Each of the first connecting bus-bar 31 and the second connecting bus-bar 32 is connected to two cells 11 adjacent to one cell 11. Therefore, the middle connecting bus-bars 3 only need to be provided with two kinds of connecting bus-bars to achieve the connections among the cells 11, thereby saving the design cost.

FIG. 3 is a schematic diagram illustrating connections among a plurality of cells 11 when a total number of the cells 11 is an even number according to a first embodiment. For example, FIG. 3 illustrates a total of six cells 11. In an arrangement direction from the first end cell 11A to the second end cell 11B, the six cells 11 may be marked as the first cell, the second cell, . . . , and the sixth cell, respectively. Consequently, arrangements of positive and negative electrodes of the sixth, the third and the second cells are the same, and arrangements of positive and negative electrodes of the fifth, the fourth and the first cells are the same. The arrangement of the positive and negative electrodes of the sixth cell is opposite to the arrangement of the positive and negative electrodes of the fifth cell.

Consequently, the tail connecting bus-bar 4 between the sixth cell and the fifth cell may be located on the same side of the sixth cell and the fifth cell, in such a manner that the tail connecting bus-bar 4 avoids the safety valve 113 between the first side 1A and the second side 1B. The arrangements of the positive and negative electrodes of the first cell and the second cell at the first end of the cell row 1 are opposite to each other, so that the positive electrode connecting plate 21 and the negative electrode connecting plate 22 may be located at the same side.

FIG. 4 is a schematic diagram illustrating connections among a plurality of cells 11 when a total number of the cells 11 is an odd number according to a second embodiment. For example, FIG. 4 illustrates a total of five cells 11. In the arrangement direction from the first end cell 11A to the second end cell 11B, the five cells 11 may be marked as the first cell, the second cell, . . . , and the fifth cell, respectively. Arrangements of positive and negative electrodes of the fifth cell, the second cell and the first cell are the same, and arrangements of positive and negative electrodes of the fourth cell and the third cell are the same. The arrangements of the positive and negative electrodes of the fifth cell and the fourth cell are opposite to each other.

Consequently, the tail connecting bus-bar 4 between the fifth cell and the fourth cell may be located at the same side of the fifth cell and the fourth cell, in such a manner that the tail connecting bus-bar 4 avoids the safety valve 113 between the first side 1A and the second side 1B. In this manner, the arrangements of the positive and negative electrodes of the first cell 11 and the second cell 11 at the first end of the cell row 1 are the same, so that the positive electrode connecting plate 21 and the negative electrode connecting plate 22 may be respectively located at the first side 1A and the second side 1B of the cell row 1.

Figure 5:
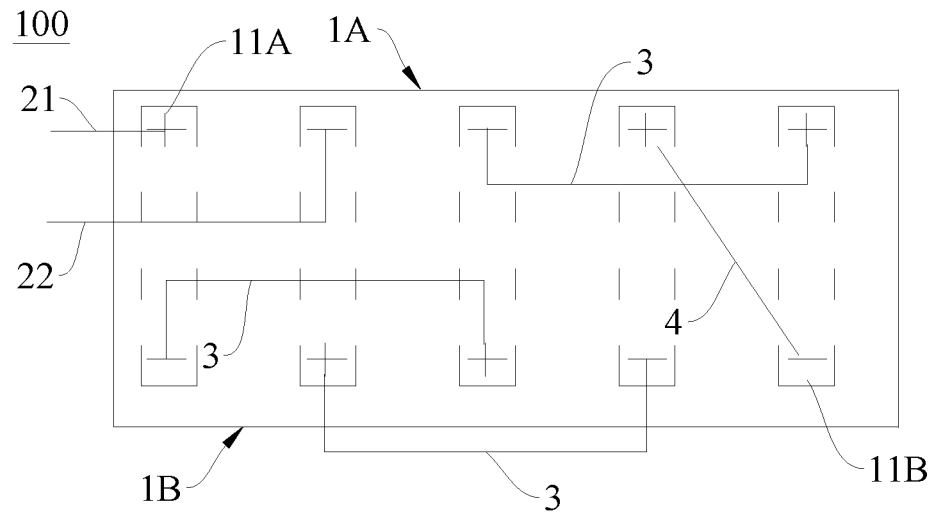
FIG. 5 is a schematic diagram illustrating connections among a plurality of cells according to a third embodiment of the present disclosure.

In some specific embodiments, as illustrated in FIG. 5, the arrangement of the positive and negative electrodes of the second end cell 11B may be identical to the arrangement of the positive and negative electrodes of the cell 11 adjacent to the second end cell 11B. The tail connecting bus-bar 4 is connected to the electrode plate at the first side 1A of the second end cell 11B and the electrode plate at the second side 1B of the cell 11 adjacent to the second end cell 11B, or the tail connecting bus-bar 4 is connected to the electrode plate at the second side 1B of the second end cell 11B and the electrode plates at the first side 1A of the cell 11 adjacent to the second end cell 11B.

In order to prevent the tail connecting bus-bar 4 from shielding the safety valve 113 when the tail connecting bus-bar 4 extends from the first side 1A to the second side 1B, the tail connecting bus-bar 4 may be provided with an avoidance concave portion for avoiding the safety valve 113, so as to ensure the normal operation of the safety valve 113.

In some specific embodiments, as illustrated in FIG. 5, an arrangement of positive and negative electrodes of $(4n)^{th}$ and $(4n-1)^{th}$ cells 11 counted from the second end cell 11B is opposite to the arrangement of the positive and negative electrodes of the second end cell 11B, and an arrangement of positive and negative electrodes of $(4n-2)^{th}$ and $(4n-3)^{th}$ cells counted from the second end cell 11B is identical to the arrangement of the positive and negative electrodes of the second end cell 11B, where n may be a positive integer. At this time, the arrangement of the positive and negative electrodes of the second end cell 11B is identical to the arrangement of the positive and negative electrodes of the cell 11 adjacent to the second end cell 11B and located on the inward side of the second end cell 11B.

In addition, according to the above arrangements, as illustrated in FIG. 5, the middle connecting bus-bars 3 include the first connecting bus-bar 31 and the second connecting bus-bar 32. Each of the first connecting bus-bar 31 and the second connecting bus-bar 32 is connected to two cells 11 adjacent to one cell 11. Therefore, the middle connecting bus-bars 3 only need to be provided with two kinds of connecting bus-bars to achieve the connections among the cells 11, thereby saving the design cost.

FIG. 5 is a schematic diagram illustrating connections among a plurality of cells 11 according to a third embodiment of the present disclosure. For example, FIG. 5 illustrates a total of five cells 11. In the arrangement direction from the first end cell 11A to the second end cell 11B, the five cells 11 may be marked as the first cell, the second cell, . . . , and the fifth cell, respectively. Arrangements of positive and negative electrodes of the fifth cell, the fourth cell and the first cell are the same, and arrangements of positive and negative electrodes of the third cell and the second cell are the same. The arrangement of the positive and negative electrodes of the first cell is opposite to that of the second cell.

Consequently, the tail connecting bus-bar 4 between the fifth cell and the fourth cell may be connected between the second side 1B and the first side 1A. The tail connecting bus-bar 4 may be provided with the avoidance concave portion for avoiding the safety valve 113, so as to ensure the normal operation of the safety valve 113. The arrangements of the positive and negative electrodes of the first cell and the second cell at the first end of the cell row 1 are opposite to each other, so that the positive electrode connecting plate 21 and the negative electrode connecting plate 22 may be located at the same side.

Figure 6:
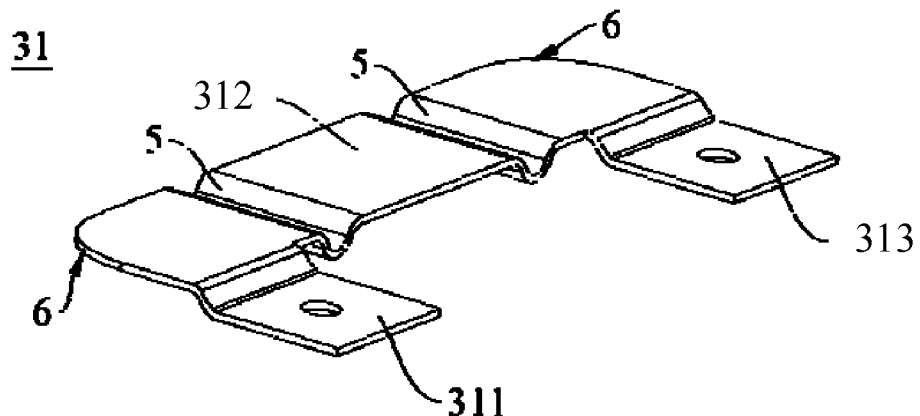
FIG. 6 is a schematic diagram of a first connecting bus-bar according to embodiments of the present disclosure.

In some embodiments, as illustrated in FIGS. 1 and 6, the first connecting bus-bar 31 may include a first positive electrode plate 311, a first connecting plate 312, and a first negative electrode plate 313. The first positive electrode plate 311 may be parallel to the first negative electrode plate 313. The first connecting plate 312 may be vertically connected to the same sides of the first positive electrode plate 311 and the first negative electrode plate 313 respectively. The first positive electrode plate 311 may be welded and fixed to the positive electrode plate 111 of one of the cells 11. The first negative electrode plate 313 may be welded and fixed to the negative electrode plate 112 of a cell 11 spaced from the cell 11 connected to the first positive electrode plate 311 by one cell 11. The first connecting plate 312 may be located between the first side 1A and the second side 1B. The first positive electrode plate 311 and the first negative electrode plate 313 may be provided with welding holes at welding points for visual positioning and welding accuracy improvement.

Figure 7:
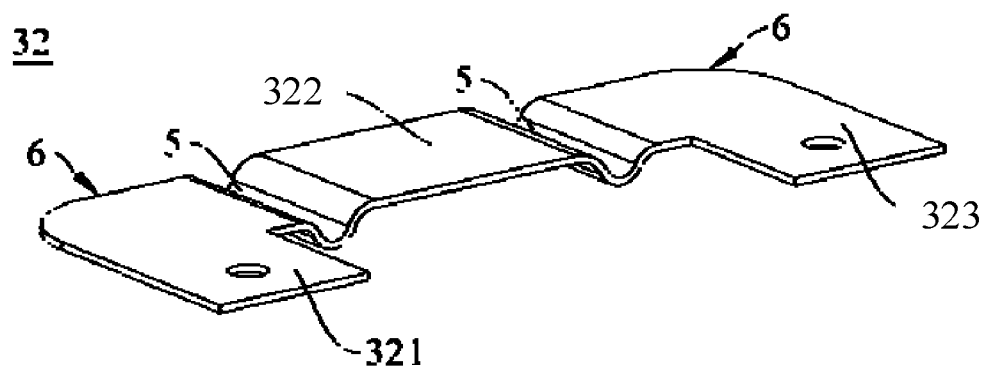
FIG. 7 is a schematic diagram of a second connecting bus-bar according to embodiments of the present disclosure.

As illustrated in FIGS. 1 and 7, the second connecting bus-bar 32 may include a second positive electrode plate 321, a second connecting plate 322, and a second negative electrode plate 323. The second positive electrode plate 321 may be parallel to the second negative electrode plate 323. The second connecting plate 322 may be vertically connected to the same sides of the second positive electrode plate 321 and the second negative electrode plate 323 respectively.

As illustrated in FIG. 1, the second positive electrode plate 321 may be welded and fixed to the positive electrode plate 111 of one of the cells 11. The second negative electrode plate 323 may be welded and fixed to the negative electrode plate 112 of a cell 11 spaced from the cell 11 connected to the second positive electrode plate 321 by one cell. The second connecting plate 322 may be located between the first side 1A and the second side 1B. The second positive electrode plate 321 and the second negative electrode plate 323 may be provided with welding holes at welding points for visual positioning and welding accuracy improvement.

As illustrated in FIGS. 1, 6 and 7, a height of the second connecting plate 322 may be identical to a height of the second positive electrode plate 321 and a height of the second negative electrode plate 323, and a height of the first connecting plate 312 may be higher than a height of the first positive electrode plate 311 and a height of the first negative electrode plate 313. A step structure may be provided between the first connecting plate 312 and the first positive electrode plate 311, and a step structure may be provided between the first connecting plate 312 and the first negative electrode plate 313.

Consequently, the first connecting bus-bar 31 and the second connecting bus-bar 32 that are adjacent to each other may be partially overlapped. The first connecting bus-bar 31 may be fixed to a cell 11 between two cells 11 connected to one second connecting bus-bar 32, so that in the first connecting bus-bar 31 and second connecting bus-bar 32 that are adjacent to each other, the first connecting plate 312 may be arranged above the second connecting plate 322, thereby saving an overall installation space of the middle connecting bus-bars 3 and facilitating arrangement.

In some specific embodiments, an insulating layer (for example, a Polyimide (PI) layer or a polyethylene terephthalate (PET) layer) may be provided between the first connecting plate 312 and the second connecting plate 322, so as to avoid a current leakage between the first connecting plate 312 and the second connecting plate 322, which would otherwise lead to a short circuit.

As illustrated in FIGS. 6 and 7, each of the first connecting plate 312 and the second connecting plate 322 may be provided with a downwardly bent groove 5 at a contact gap between two adjacent cells 11. The groove 5 may provide a deformation margin for the first connecting bus-bar 31 and the second connecting bus-bar 32. Since both the first connecting bus-bar 31 and the second connecting bus-bar 32 are connected to different cells 11, when the cells 11 expand, distances between the cells 11 increase. Thus, the first connecting bus-bar 31 and the second connecting bus-bar 32 are elongated. The groove 5 between the first connecting plate 312 and the second connecting plate 322 is flattened to provide a stretching margin, so as to prevent the first connecting bus-bar 31 and the second connecting bus-bar 32 from being broken.

Figure 8:
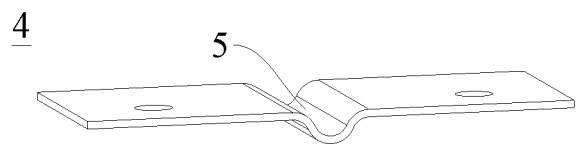
FIG. 8 is a schematic diagram of a tail connecting bus-bar according to embodiments of the present disclosure.

As illustrated in FIG. 8, in an embodiment in which the tail connecting bus-bar 4 is connected to both the second end cell 11B and the cell 11 adjacent to the second end cell 11B at the same side, the tail connecting bus-bar 4 may be correspondingly provided with the downwardly bent groove 5 between the second end cell 11B and the cell 11 adjacent to the second end cell 11B. The groove 5 may provide the deformation margin for the tail connecting bus-bar 4. Since the tail connecting bus-bar 4 is connected to different cells 11, when the cells 11 expand, a distance between the two cells 11 increases. Thus, the tail connecting bus-bar 4 is elongated. The groove 5 of the tail connecting bus-bar 4 is flattened to provide the stretching margin, so as to prevent the tail connecting bus-bar 4 from being broken.

In some specific embodiments, as illustrated in FIGS. 6 and 7, since the current follows an arch path at corners of the first connecting plate 312 and the second connecting plate 322, a top corner of the first connecting plate 312 at a side facing away from the first positive electrode plate 311 may be a rounded corner 6, and a top corner of the second connecting plate 322 at a side facing away from the second positive electrode plate 321 may be a rounded corner 6. This can not only ensure that the current flows in the first connecting plate 312 and the second connecting plate 322, and but also reduce weights of the first connecting bus-bar 31 and the second connecting bus-bar 32.

Similarly, as illustrated in FIG. 1, at least one of the positive electrode connecting plate 21 and the negative electrode connecting plate 22 may have a bending portion 23 that is bent on a plane where the top surface of the cell 11 is located. A bending corner of the bending portion 23 may be a rounded corner 6, which can not only ensure that the current may flow in the bending portion 23, but also reduce a weight of the bending portion 23.

In addition, at least one of the positive electrode connecting plate 21 and the negative electrode connecting plate 22 has an avoidance opening to avoid the safety valve 113 of the cell 11, so as to ensure that the safety valve 113 works normally.

In some specific embodiments, as illustrated in FIG. 1, the battery module 100 may further include a cube-shaped module frame 7. The cell row 1 may be positioned in the module frame 7. A length direction of the cell row 1 may be a direction along a length direction of the module frame 7, and a width direction of the cell row 1 may be a direction along a width direction of the module frame 7.

As illustrated in FIG. 1, an upper end surface between two longer sides of the module frame 7 is provided with a mounting plate 71. The mounting plate 71 may extend towards the cell row 1 and rest against a side of the cell row 1 facing towards the longer sides of the module frame 7. Each of the output electrode connecting plates 2 has a bending structure. Each of the positive electrode connecting plate 21 and the negative electrode connecting plate 22 may include a first plate 241, a second plate 242, and a third plate 243. The second plate 242 may be connected between the first plate 241 and the third plate 243.

As illustrated in FIG. 1, the first plate 241 may be attached to a top surface of the cell row 1 and is connected to the cell 11. The second plate 242 may be attached to a side of the first end cell 11A facing towards a longer side of a corresponding end of the module frame 7. The third plate 243 may be attached and fixed to a top surface of the mounting plate 71. The mounting plate 71 may provide mounting points for the output electrode connecting plates 2 and the high-voltage wire harnesses, that is, the output electrode connecting plates 2 and the high-voltage wire harnesses may be fixed to the mounting plate 71 together.

A battery pack for a vehicle according to embodiments of the present disclosure will be described in the following.

The battery pack according to the embodiments of the present disclosure is provided with the battery module 100 as described in any of the foregoing embodiments of the present disclosure.

With the battery pack according to the embodiments of the present disclosure, the arrangement of the battery module 100 reduces the wiring length of the high-voltage wire harnesses in the battery pack, thereby avoiding a long-distance parallel wiring between the low-voltage wire harnesses and the high-voltage wire harnesses in the battery pack while ensuring the accuracy of signal acquisition and transmission in the low-voltage wire harnesses.

The above are only preferred embodiments of the present disclosure, and are not intended to limit the present disclosure. Any modification, equivalent replacement, improvement, etc., made within the spirit and principle of the present disclosure shall be included in the protection scope of the present disclosure.

What is claimed is:

1. A battery module, comprising:
    a cell row comprising a plurality of cells arranged in series with each other in a row, the cell row having a first end and a second end in an arrangement direction of the plurality of cells, and the plurality of cells comprising a first end cell at the first end and a second end cell at the second end;
    output electrode connecting plates comprising a positive electrode connecting plate and a negative electrode connecting plate, one of the positive electrode connecting plate and the negative electrode connecting plate being connected to the first end cell, and another one being connected to a cell adjacent to the first end cell; and
    connecting bus-bars comprising middle connecting bus-bars and a tail connecting bus-bar, the tail connecting bus-bar being adapted to connect the second end cell to a cell adjacent to the second end cell, and the middle connecting bus-bars being adapted to connect remaining electrodes of the plurality of cells,
    wherein an arrangement of positive and negative electrodes of the second end cell is opposite to an arrangement of positive and negative electrodes of the cell adjacent to the second end cell, wherein, a positive electrode plate and a negative electrode plate of each of the plurality of cells are respectively arranged at a first side and a second side of a top surface of the cell, a safety valve is provided between the positive electrode plate and the negative electrode plate of each of the plurality of cells, the connecting bus-bars are divided into two groups, and the two groups are respectively arranged at the first side and the second side in such a manner that the connecting bus-bars avoid the safety valve;
    wherein an arrangement of positive and negative electrodes of $(4n)^{th}$ and $(4n-1)^{th}$ cells counted from the second end cell is identical to the arrangement of the positive and negative electrodes of the second end cell, and an arrangement of positive and negative electrodes of $(4n-2)^{th}$ and $(4n-3)^{th}$ cells counted from the second end cell is opposite to the arrangement of the positive and negative electrodes of the second end cell, where n is a positive integer; and
    wherein the middle connecting bus-bars comprise a first connecting bus-bar and a second connecting bus-bar, each of the first connecting bus-bar and the second connecting bus-bar being connected to two cells adjacent to one of the plurality of cells.

2. A battery module, comprising:
    a cell row comprising a plurality of cells arranged in series with each other in a row, the cell row having a first end and a second end in an arrangement direction of the plurality of cells, and the plurality of cells comprising a first end cell at the first end and a second end cell at the second end;
    output electrode connecting plates comprising a positive electrode connecting plate and a negative electrode connecting plate, one of the positive electrode connecting plate and the negative electrode connecting plate being connected to the first end cell, and another one being connected to a cell adjacent to the first end cell; and
    connecting bus-bars comprising middle connecting bus-bars and a tail connecting bus-bar, the tail connecting bus-bar being adapted to connect the second end cell to a cell adjacent to the second end cell, and the middle connecting bus-bars being adapted to connect remaining electrodes of the plurality of cells,
    wherein an arrangement of positive and negative electrodes of the second end cell is identical to an arrangement of positive and negative electrodes of the cell adjacent to the second end cell,
    wherein positive electrode plate and negative electrode plate of each of the plurality of cells are respectively arranged at a first side and a second side of a top surface of the cell, a safety valve is provided between the positive electrode plate and the negative electrode plate of each of the plurality of cells, the middle connecting bus-bars are divided into two groups, the two groups are respectively arranged at the first side and the second side to allow the middle connecting bus-bars to avoid the safety valve, and the tail connecting bus-bar is provided with an avoidance concave portion for avoiding the safety valve;
    wherein an arrangement of positive and negative electrodes of $(4n)^{th}$ and $(4n-1)^{th}$ cells counted from the second end cell is opposite to the arrangement of the positive and negative electrodes of the second end cell, and an arrangement of positive and negative electrodes of $(4n-2)^{th}$ and $(4n-3)^{th}$ cells counted from the second end cell is identical to the arrangement of the positive and negative electrodes of the second end cell, where n is a positive integer; and
    wherein the middle connecting bus-bars comprise a first connecting bus-bar and a second connecting bus-bar, each of the first connecting bus-bar and the second connecting bus-bar being connected to two cells adjacent to one of the plurality of cells.

3. The battery module of claim 1, wherein the first connecting bus-bar comprises a first positive electrode plate, a first connecting plate, and a first negative electrode plate, the first positive electrode plate being parallel to the first negative electrode plate, the first connecting plate being vertically connected to a same side of the first positive electrode plate and the first negative electrode plate, and a height of the first connecting plate being higher than a height of the first positive electrode plate and a height of the first negative electrode plate; and
    the second connecting bus-bar comprises a second positive electrode plate, a second connecting plate, and a second negative electrode plate, the second positive electrode plate being parallel to the second negative electrode plate, the second connecting plate being vertically connected to a same side of the second positive electrode plate and the second negative electrode plate, and a height of the second connecting plate being identical to a height of the second positive electrode plate and a height of the second negative electrode plate; and wherein for the first connecting bus-bar and the second connecting bus-bar that are adjacent to each other, the first connecting plate is arranged above the second connecting plate.

4. The battery module of claim 2, wherein the first connecting bus-bar comprises a first positive electrode plate, a first connecting plate, and a first negative electrode plate, the first positive electrode plate being parallel to the first negative electrode plate, the first connecting plate being vertically connected to a same side of the first positive electrode plate and the first negative electrode plate, and a height of the first connecting plate being higher than a height of the first positive electrode plate and a height of the first negative electrode plate; and the second connecting bus-bar comprises a second positive electrode plate, a second connecting plate, and a second negative electrode plate, the second positive electrode plate being parallel to the second negative electrode plate, the second connecting plate being vertically connected to a same side of the second positive electrode plate and the second negative electrode plate, and a height of the second connecting plate being identical to a height of the second positive electrode plate and a height of the second negative electrode plate; and wherein for the first connecting bus-bar and the second connecting bus-bar that are adjacent to each other, the first connecting plate is arranged above the second connecting plate.

5. The battery module of claim 3, wherein an insulating layer is provided between the first connecting plate and the second connecting plate.

6. The battery module of claim 4, wherein an insulating layer is provided between the first connecting plate and the second connecting plate.

7. The battery module of claim 3, wherein each of the first connecting plate and the second connecting plate is provided with a downwardly bent groove at a contact gap between two adjacent ones of the plurality of cells.

8. The battery module of claim 4, wherein each of the first connecting plate and the second connecting plate is provided with a downwardly bent groove at a contact gap between two adjacent ones of the plurality of cells.

9. The battery module of claim 3, wherein a top corner of the first connecting plate at a side facing away from the first positive electrode plate is a rounded corner; and a top corner of the second connecting plate at a side facing away from the second positive electrode plate is a rounded corner.

10. The battery module of claim 4, wherein a top corner of the first connecting plate at a side facing away from the first positive electrode plate is a rounded corner; and a top corner of the second connecting plate at a side facing away from the second positive electrode plate is a rounded corner.

11. The battery module of claim 1, wherein at least one of the positive electrode connecting plate and the negative electrode connecting plate comprises a bending portion, a bending corner of the bending portion being a rounded corner, and at least one of the positive electrode connecting plate and the negative electrode connecting plate has an avoidance opening for avoiding the safety valve of the cell.

12. The battery module of claim 2, wherein at least one of the positive electrode connecting plate and the negative electrode connecting plate comprises a bending portion, a bending corner of the bending portion being a rounded corner, and at least one of the positive electrode connecting plate and the negative electrode connecting plate has an avoidance opening for avoiding the safety valve of the cell.

13. The battery module of claim 2, wherein at least one of the positive electrode connecting plate and the negative electrode connecting plate comprises a bending portion, a bending corner of the bending portion being a rounded corner, and at least one of the positive electrode connecting plate and the negative electrode connecting plate has an avoidance opening for avoiding the safety valve of the cell.

14. The battery module of claim 1, further comprising a cube-shaped module frame, wherein the cell row is positioned in the cube-shaped module frame, and an upper end surface between two longer sides of the cube-shaped module frame is provided with a mounting plate, the mounting plate extending towards the cell row and resting against a side of the cell row facing towards the longer sides; and wherein each of the output electrode connecting plates has a bending structure and comprises: a first plate adapted to be attached to a top surface of the cell row, a second plate adapted to be attached to a side of the cell row facing towards the longer sides, and a third plate adapted to be attached and fixed to a top surface of the mounting plate.

15. The battery module of claim 2, further comprising a cube-shaped module frame, wherein the cell row is positioned in the cube-shaped module frame, and an upper end surface between two longer sides of the cube-shaped module frame is provided with a mounting plate, the mounting plate extending towards the cell row and resting against a side of the cell row facing towards the longer sides; and wherein each of the output electrode connecting plates has a bending structure and comprises: a first plate adapted to be attached to a top surface of the cell row, a second plate adapted to be attached to a side of the cell row facing towards the longer sides, and a third plate adapted to be attached and fixed to a top surface of the mounting plate.

16. The battery module of claim 2, further comprising a cube-shaped module frame, wherein the cell row is positioned in the cube-shaped module frame, and an upper end surface between two longer sides of the cube-shaped module frame is provided with a mounting plate, the mounting plate extending towards the cell row and resting against a side of the cell row facing towards the longer sides; and wherein each of the output electrode connecting plates has a bending structure and comprises: a first plate adapted to be attached to a top surface of the cell row, a second plate adapted to be attached to a side of the cell row facing towards the longer sides, and a third plate adapted to be attached and fixed to a top surface of the mounting plate.

17. A battery pack for a vehicle, comprising the battery module of claim 1.

18. A battery pack for a vehicle, comprising the battery module of claim 2.

19. A battery pack for a vehicle, comprising the battery module of claim 2.

* * * * *